United States Patent [19]
Briggs

[11] Patent Number: 5,928,481
[45] Date of Patent: Jul. 27, 1999

[54] APPARATUS FOR STERILISING WATER BY THE PROCESS OF HEAVY METAL STERILISATION USING SILVER

[75] Inventor: William Ernest Briggs, Grovedale, Australia

[73] Assignee: Austech Limited, Spotswood, Australia

[21] Appl. No.: 08/737,550

[22] PCT Filed: May 15, 1995

[86] PCT No.: PCT/AU95/00280

§ 371 Date: Nov. 12, 1996

§ 102(e) Date: Nov. 12, 1996

[87] PCT Pub. No.: WO95/31404

PCT Pub. Date: Nov. 23, 1995

[30] Foreign Application Priority Data

May 13, 1994 [AU] Australia .............................. PM 5627

[51] Int. Cl.⁶ .................................................. C25B 9/00
[52] U.S. Cl. .......................... 204/275; 204/228; 204/229
[58] Field of Search .................................. 204/229, 275, 204/228, 231, 240

[56] References Cited

U.S. PATENT DOCUMENTS

| | | | |
|---|---|---|---|
| 2,105,835 | 1/1938 | Krause | 99/220 |
| 3,654,119 | 4/1972 | White et al. | 204/228 |
| 4,061,556 | 12/1977 | Reis et al. | 204/221 |
| 4,119,517 | 10/1978 | Hengst | 204/229 |
| 4,525,253 | 6/1985 | Hayes et al. | 204/149 |
| 4,936,979 | 6/1990 | Brown | 210/85 |

FOREIGN PATENT DOCUMENTS

| | | |
|---|---|---|
| 146126 | 4/1952 | Australia . |
| A1-40301/78 | 4/1980 | Australia . |
| 47243/85 | 3/1986 | Australia . |
| 69875/87 | 10/1987 | Australia . |
| A-69875/87 | 10/1987 | Australia . |
| 0 128 782 | 12/1984 | European Pat. Off. . |
| 95 91 8456 | 4/1997 | European Pat. Off. . |
| 1154117 | 5/1968 | Germany . |
| 59-189988 | 10/1984 | Japan . |
| 59-189989 | 10/1984 | Japan . |
| 59-189990 | 10/1984 | Japan . |
| 62-273096 | 11/1987 | Japan . |
| 4-90886 | 3/1992 | Japan . |
| 5-154477 | 6/1993 | Japan . |
| 5-245480 | 9/1993 | Japan . |
| 605421 | 9/1978 | Switzerland . |
| 432101 | 7/1935 | United Kingdom . |
| 2270395 | 9/1994 | United Kingdom . |
| WO 89/08081 | 9/1989 | WIPO . |
| WO 90/10734 | 9/1990 | WIPO . |
| WO 93/05861 | 4/1993 | WIPO . |

*Primary Examiner*—Kathryn Gorgos
*Assistant Examiner*—Thomas H. Parsons
*Attorney, Agent, or Firm*—Alston & Bird, LLP

[57] ABSTRACT

The invention provides water sterilizing apparatus (10) adapted to employ the process of heavy metal sterilization and including a body (11) defining a chamber (12) formed with spaced inlet and outlet openings (13, 14) whereby water may be caused to flow through the chamber, a silver anode (15) to coact with at least one cathode (16) spacedly mounted in said chamber for release of Ag+ ions to the flow of water therebetween; electric circuit means (17) including power cell means (18) associated with said body and connected to said electrodes (15, 16); an on/off switch (20) in said circuit means (17) normally disposed inoperatively so that the circuit is open when water is not entering said chamber (12) at said inlet opening (13), and a switch-actuating valve assembly (21) mounted movably adjacent said inlet opening, said valve assembly being normally urged in biased manner to a position in which it closes the inlet opening (13) but adapted to be moved against said bias by water caused to flow through said inlet opening whereby said water enters and passes through said chamber and out said outlet opening, and the parts being so made and arranged that movement of said switch-actuating valve assembly (21) to open the inlet opening (13) causes said normally-open switch (20) to be closed to complete the circuit.

6 Claims, 3 Drawing Sheets

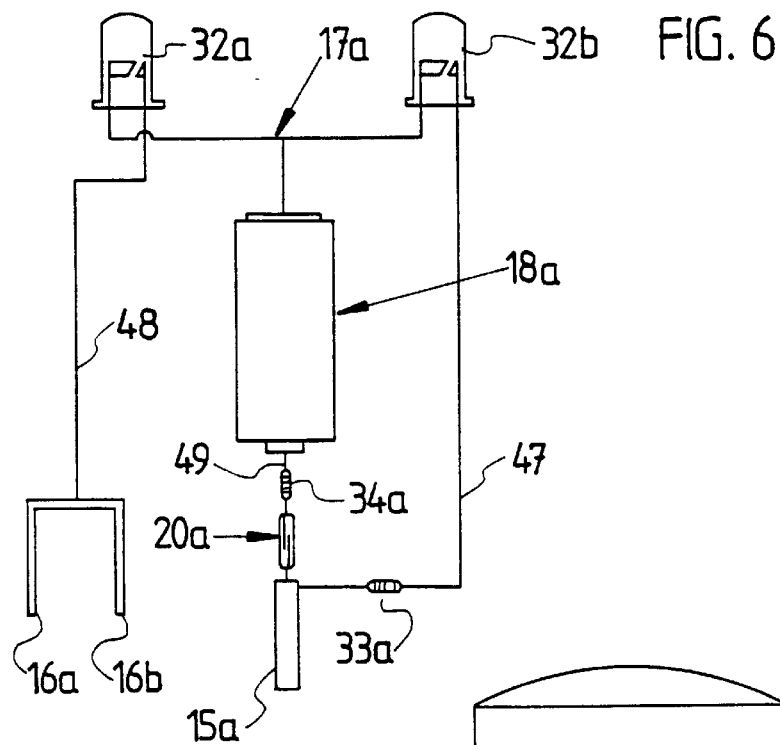
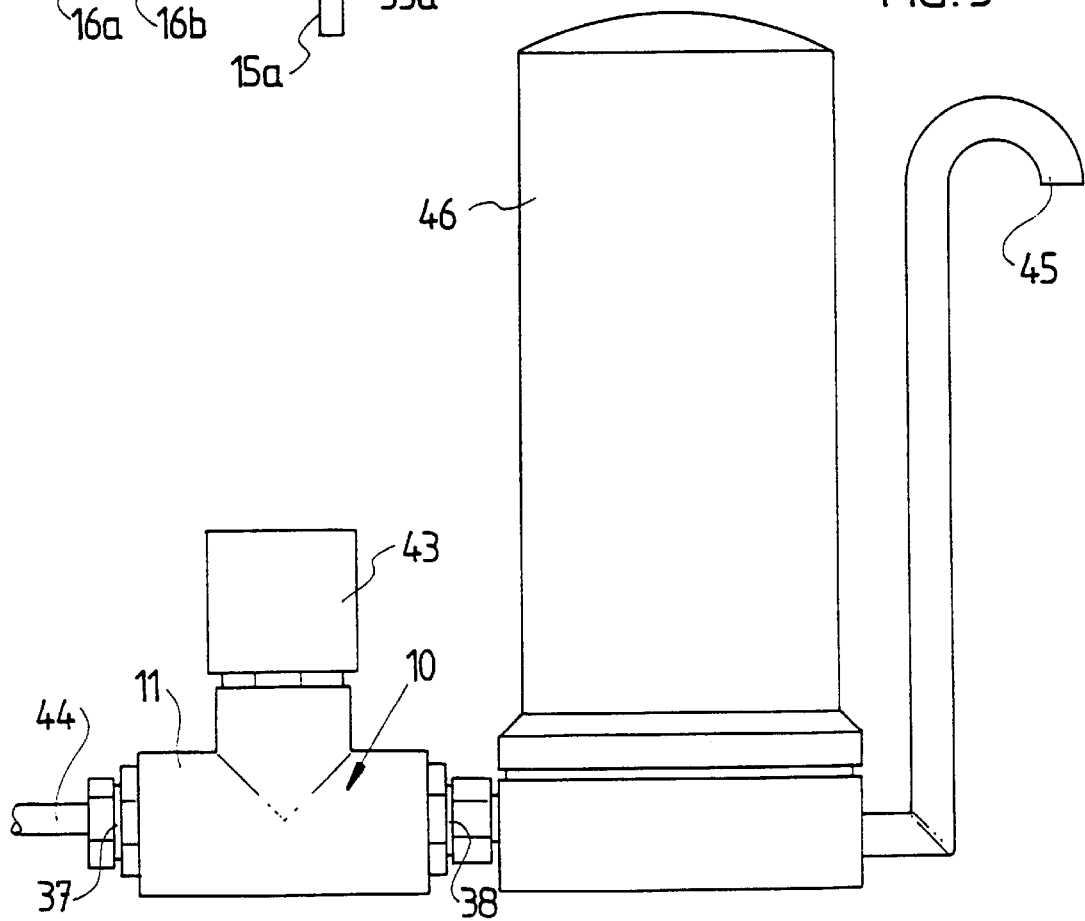

APPARATUS FOR STERILISING WATER BY THE PROCESS OF HEAVY METAL STERILISATION USING SILVER

This application is a National Stage Application of PCT/AU95/00280, filed May, 15, 1995.

TECHNICAL FIELD OF THE INVENTION

THIS INVENTION relates to a water sterilisation apparatus, and more particularly it relates to an apparatus for sterilising water by the process of heavy metal sterilisation using the bacteriostatic effect of the heavy metal, silver. While the invention has particular application in destroying disease-carrying bacteria in drinking water and is described herein in that context, it will be realised that the invention is not limited to that particular field of use but may have wider and different applications.

BACKGROUND ART

As is well known and also disclosed in various prior patent specifications, the high affinity that Ag+ has to —SH and other groups, makes it an efficient biocide for the treatment of water and other liquids. It will be understood that Ag+ ions, in measured doses, are toxic to lower life forms but non-toxic to humans, and in consequence this process can be used to sterilise drinking water. Previous apparatus for these purposes and patent specifications directed thereto have shown however that prior usages have required large and heavy apparatus for Ag+ ion release, as well as complicated apparatus for waterflow control, and also switches at high cost. Such apparatus, electrical circuits and switches have been arranged to release Ag+ ions at a minimal yet reasonably effective rate, but the bulkiness alone would not in the past allow a unit to be made to a size permitting it to be carried manually or in a relatively small suit case or the like.

In the prior art, considerable work has been carried out also in the development and use of apparatus using silver pills for the same purposes, but many problems have been encountered such as having to keep the pills dry, packaging the pills so that the silver does not corrode and so that the Ag+ does not come into contact with the atmosphere prior to use. Since other chemicals may be needed to bind the Ag+ within a pill, such additional chemicals can add further contaminants to the water. Problems also arise in relation to the question of how many pills should be used for a given volume of water.

OBJECT OF THE INVENTION

The principal object of the present invention is to provide an apparatus which will ameliorate many of the problems described above by effectively controlling the water flow rate and Ag+ ion release for effective sterilisation results using the energy of the water being treated as a controlling factor.

Another object of the present invention is to provide a water sterilisation apparatus of the character described which will have an advantage over certain prior art in that it can be operated not only in a set disposition such as in a horizontal flow line for water, but also at any given angle of use or an inverted disposition.

It is a further object to provide a novel apparatus as aforementioned which can be designed to operate very efficiently for water sterilisation while being small enough to be readily transported and carried by an individual user from place to place.

The invention further aims to provide a water sterilisation apparatus of the aforedescribed character which will have further advantages over certain prior art proposals in that it will not be subject to malfunction or operational difficulties in areas where temperature or humidity variations may be extreme. Other objects and advantages of the invention will be hereinafter set out in the descriptions of preferred or practical embodiments.

DISCLOSURE OF THE INVENTION

With the foregoing and other objects in view, the invention resides broadly, according to one aspect thereof, in a water sterilising apparatus adapted to employ the process of heavy metal sterilisation and including:

a body defining a chamber formed with spaced inlet and outlet openings whereby water may be caused to flow through the chamber from said inlet opening to said outlet opening;

at least two electrodes spacedly mounted in said chamber for flow of water therebetween in its passage from said inlet opening to said outlet opening;

electric circuit means including power cell means associated with said body and connected to said electrodes for passing electric current between said electrodes through said water;

an on/off switch in said circuit means normally disposed inoperatively so that the circuit is open when water is not entering said chamber at said inlet opening, and a switch-actuating valve assembly mounted movably adjacent to said inlet opening, said valve assembly being normally urged in biased manner to a position in which it closes the inlet opening but adapted to be moved against said bias by water caused to flow through said inlet opening whereby said water enters and passes through said chamber and out said outlet opening, said electrodes including a silver anode to coact with at least one cathode for the release of Ag+ ions, and the parts being so made and arranged that movement of said switch-actuating valve assembly to open the inlet opening causes said normally-open switch to be closed to complete the circuit whereby electric current passes between said electrodes as water flows through said chamber.

The on/off switch, as referred to, may be of various kinds but preferably includes normally spaced first and second contact members in the electric circuit means and adapted to be brought together by the influence of a magnetic field when a permanent magnet, such as a ferromagnet, is moved in a direction theretowards, said magnet comprising part of said switch-actuating valve assembly movable to open the inlet opening by transforming the potential energy from the body of water which, when caused to flow, carries the valve assembly and magnet towards said contact members to close the switch to complete the electric circuit. For practical purposes, the on/off switch may most suitably be a reed switch having at least one said contact member of movable leaf form.

For guided control of the movable switch-actuating assembly, the latter preferably includes a cylindrical valve piston slidable with clearance in a guide tube arranged so that its inner end communicates with the chamber while its outer end is provided with a valve seat at the inlet opening, the valve assembly being biased by means of a light tension spring connected between the outer face of the valve piston and part of the body upstream of the valve seat. In one embodiment, the guide tube for the cylindrical valve piston is constituted by part of the chamber walls adjacent the inlet opening, but in another embodiment, the guide tube is a separate tube removably mounted within and spaced from the adjacent walls of the chamber, the guide tube also being provided in that instance with apertures through its wall intermediate its ends to facilitate water flow therethrough to the chamber prior to the water flowing to the inner end of the guide tube.

In one embodiment hereinafter illustrated, the electrodes comprise a single silver anode and a single cathode, but in a preferred embodiment there are three electrodes comprising said silver anode as well as two stainless steel cathodes at equal distances on opposite sides thereof, all electrodes being co-planar and having freely projecting active ends within the chamber, the opposite or fixing ends being connected in the circuit means, while said opposite or fixing ends of the cathodes are also connected to each other.

In all embodiments, it is preferred that the electric circuit means includes one or more light-emitting diodes or indicators. In the simplest embodiment, there is employed a single "L.E.D." which confirms that current is flowing between the anode and cathode, but in the preferred embodiments, we would provide two light-emitting diodes arranged in series in two different colours such as yellow and green and adapted to indicate the need for various actions as later set out in detail, such as the need to clean the silver anode.

In the design of the apparatus, the body may be of any suitable material and of various suitable shapes, but it is preferred that the body be made mainly of PVC and of T-shaped form, having aligned or coaxial inlet and outlet housings for the inlet opening and outlet opening respectively, while a third housing at right angles to the inlet and outlet housings has removably fitted therein a coupler assembly, suitably with a PVC casing, fitted with said power cell means, said electrodes and said electric circuit means. In normal usage disposition of the apparatus, the aligned inlet and outlet housings will have their axes contiguous and horizontal. While the third housing may extend vertically up from and above the inlet and outlet housings, it could operate also when extending vertically down or at any predetermined angle. Other features of the invention, including use in conjunction with carbon filter assemblies and other related apparatus, will be hereinafter apparent.

BRIEF DESCRIPTION OF THE DRAWINGS

In order that the present invention may be more readily understood and put into practical effect, reference will now be made to the accompanying drawings which illustrate preferred embodiments of the invention and wherein:

FIG. 3 illustrates diagrammatically the use of the water sterilising apparatus of FIGS. 1 and 2 attached to a carbon-type filtering device as commonly used;

FIG. 6 shows a simple wiring diagram applicable to the embodiment shown in FIG. 4.

METHOD OF PERFORMANCE

Figure 1:
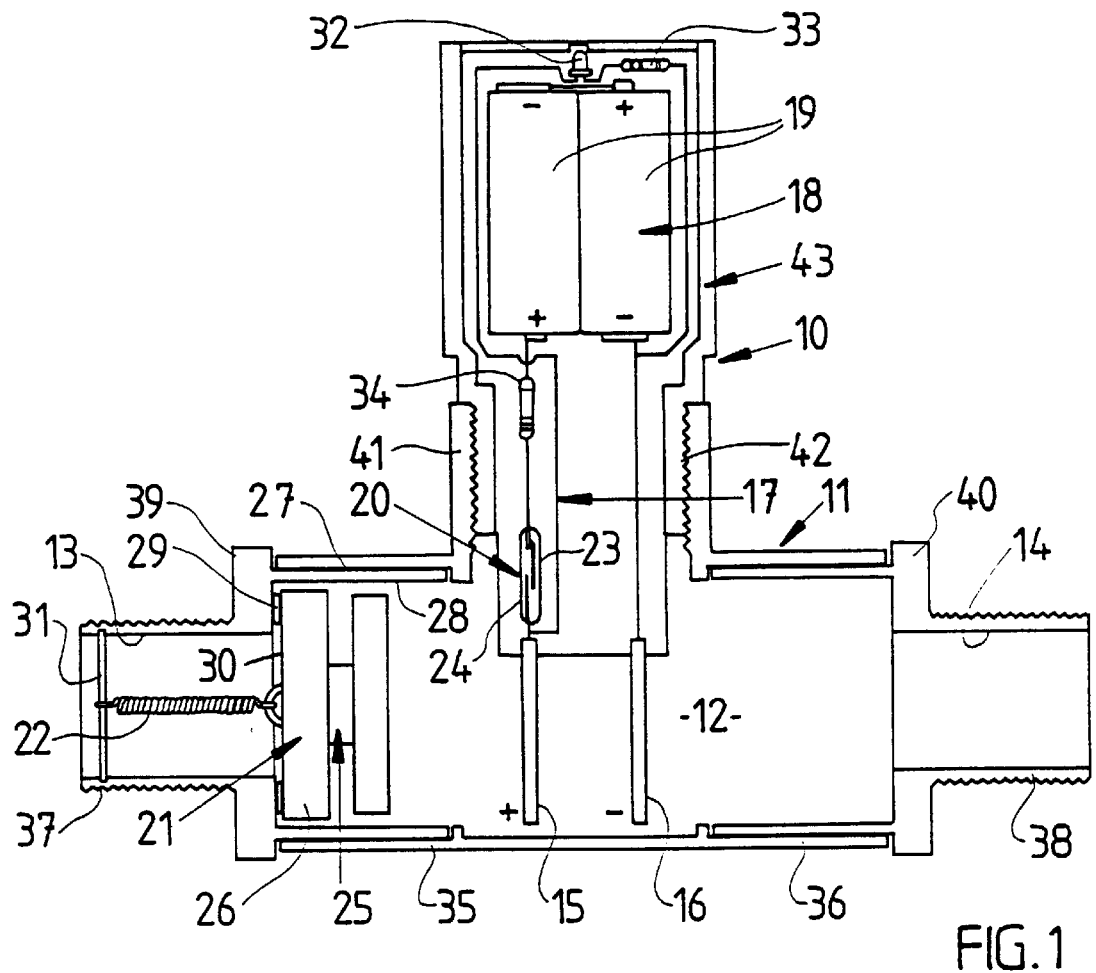
FIG. 1 is a part-diagrammatic, sectional side elevation of a first form of water sterilisation apparatus according to the invention.
Figure 2:
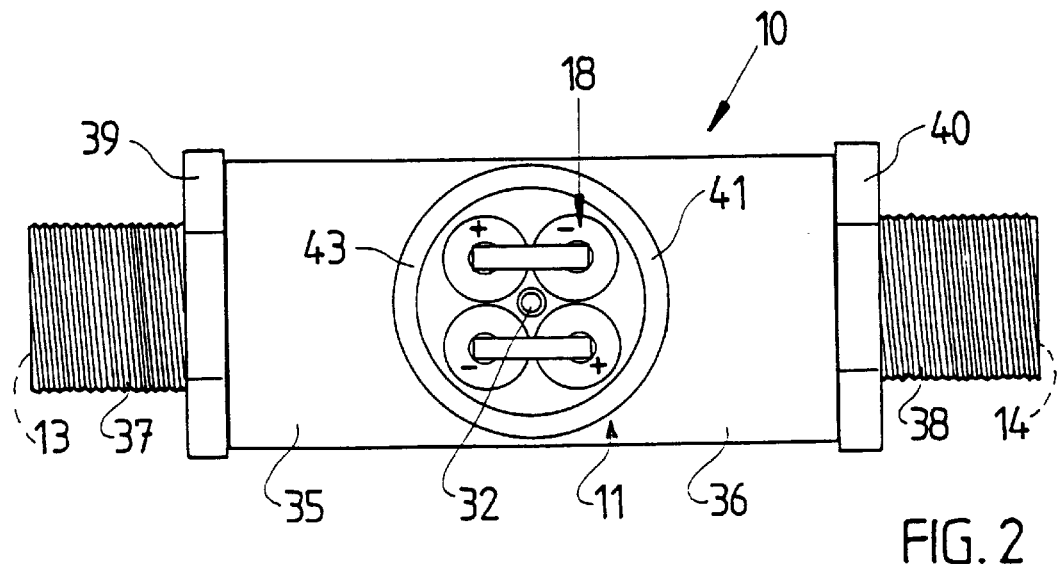
FIG. 2 is a plan view of the water sterilising apparatus shown in FIG. 1.

Referring to the drawings and initially to FIGS. 1 and 2, the water sterilising apparatus indicated generally by the numeral 10 has a body 11 defining a chamber 12 formed with spaced inlet and outlet openings 13 and 14, respectively, at opposite sides whereby water may be caused to flow through the chamber 12 from the inlet opening 13 to the outlet opening 14. In this embodiment there are two electrodes comprising a silver anode 15 and a single stainless steel cathode 16 spacedly mounted in the chamber 12 for flow of water therebetween. Electric circuit means indicated generally by the numeral 17 includes power cell means 18 comprising in this case a power pack of four 1.5 volt batteries 19 connected to the anode 15 and cathode 16 for passing current between same.

An on/off switch indicated generally at 20 is provided in the circuit means 17 and normally disposed inoperatively as illustrated so that the circuit is open when water is not entering the chamber 12 at the inlet opening 13. For control of the on/off switch 20, there is provided a switch-actuating valve assembly indicated generally at 21 and mounted movably adjacent the inlet opening 13, the assembly 21 being biased normally by a light stainless steel tension spring 22 to occupy a position in which it closes the inlet opening 13, but it is adapted to be moved against the action of the spring 22 by incoming water so that the water will enter and pass through the chamber 12. As illustrated, the parts are so made and arranged that movement of the switch-actuating valve assembly 21 against the action of the spring 22 will cause the normally-open switch 20 to be closed to complete the circuit whereby current passes between the anode 15 and cathode 16 as water flows through the chamber 12.

The on/off switch 20 has a pair of normally spaced first and second contact members 23 and 24 connected in the electrical circuit 17, there being separate leads as illustrated for the reed switch 20, anode 15 and cathode 16 respectively. The contact members 23 and 24 are of movable leaf form constituting a reed-type switch and adapted to be brought together by the influence of a magnetic field when a permanent magnet is moved towards the switch members. In this instance, there is a permanent magnet in the form of a ferromagnet 25 forming part of the switch-actuating valve assembly 21, the magnet 25 being mounted on a piston 26 which is substantially cylindrical and movable guidedly with clearance in a guide tube 27 (in this case the inner wall surface 28 forming part of the chamber 12) so that the inner end of the tube 27 communicates with (or is part of) the chamber 12, while the outer end of the guide tube 27 is formed into a wall having a valve seat 29 at the inlet opening 13. The aforementioned light tension spring 22 is thus connected between the outer face 30 of the valve piston 26 and an anchoring member 31 upstream of the valve seat 29 and the inlet opening 13.

The electric circuit means 17 will be seen to include an L.E.D. (light-emitting diode) shown at 32 to confirm that current is flowing between the anode 15 and cathode 16. The circuit also includes resisters shown at 33 and 34. As apparent from FIGS. 1 and 2, the body 11 can suitably be made of moulded polyvinylchloride (PVC) or equivalent plastics material so that in use it will have a horizontally disposed cylindrical section with an inlet housing 35 at one end and an outlet housing 36 at the other end, having aligned or coaxial openings as shown. The housings 35 and 36 in this instance have externally threaded ends 37 and 38 adjacent hexagonal-headed sections 39 and 40, while their tubular inner ends are fusion sealed to and within the cylindrical section of the body 10 which is integral with a tapped upper or third housing 41 which receives the lower externally threaded end 42 of a PVC coupler assembly 43 carrying the power cell means, the electrodes and the electric circuit means generally.

As shown in FIG. 3, the apparatus 10 requires that an inlet hose 44 be attached to the threaded end 37 at the inlet housing 35, while the threaded end 38 at the outlet housing 36 is connected to a delivery spout member 45 via a housing 46 containing in this instance granular activated carbon for filtering purposes.

Figure 4:
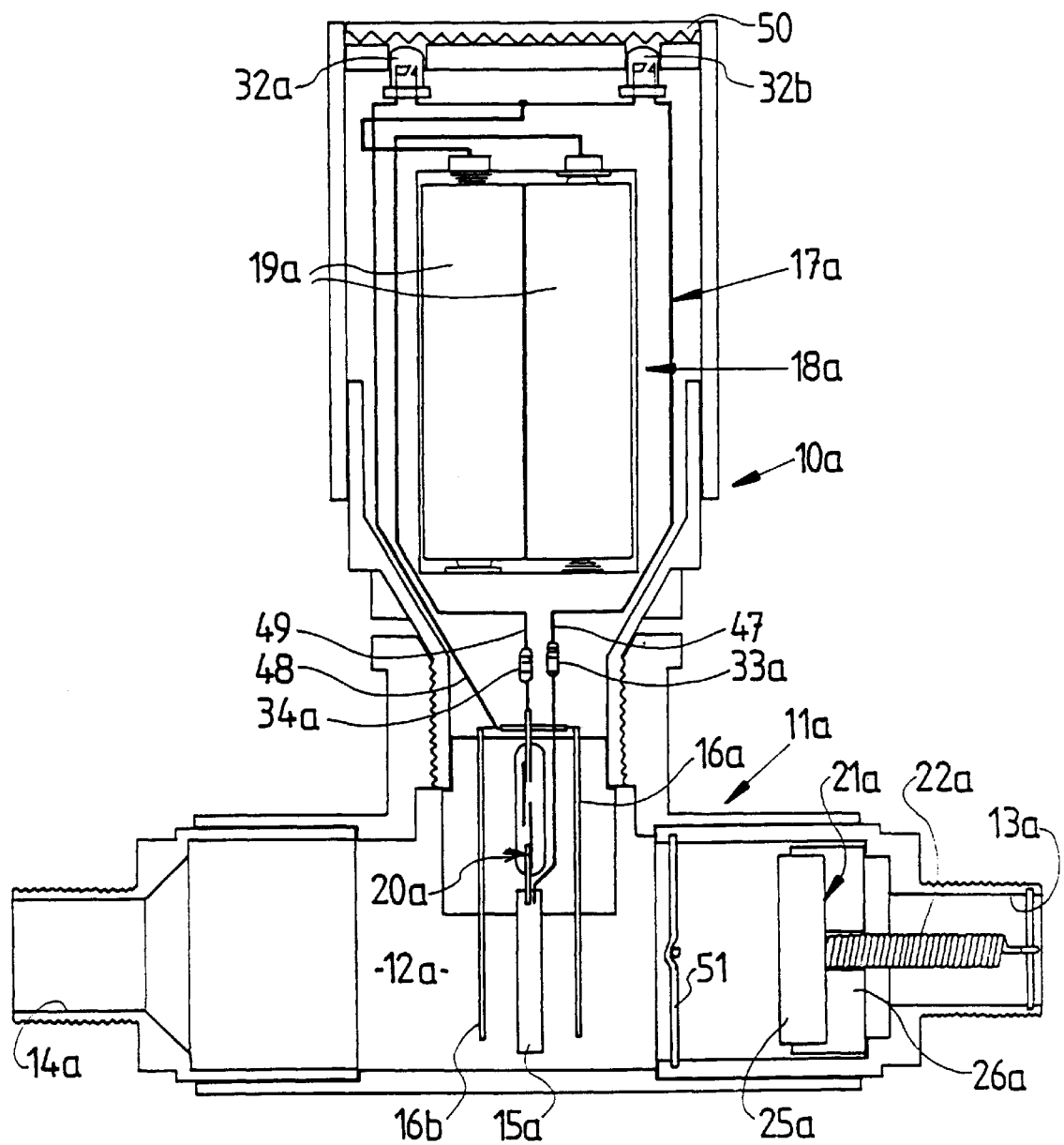
FIG. 4 is a view corresponding to FIG. 1 but of a modified embodiment of the invention.

Referring now to FIG. 4, this corresponds to FIG. 1 but shows a modified form of a water sterilisation apparatus, the same numerals being used for corresponding components but suffixed by the letter "a". Thus, the apparatus 10a has a chamber 12a in its body 11a which is provided with an inlet opening 13a and outlet opening 14a. However, in this case the silver anode 15a co-acts with a pair of stainless steel cathodes 16a and 16b in the electric circuit means 17a so that again the power cell means 18a has four batteries 19a and an on/off switch 20a having the same action and basic parts as the switch 20 in FIG. 1. The two cathodes are interconnected at their fixing ends, while the circuit means 17a in this case has two L.E.D.'s namely a yellow L.E.D. 32a and a green L.E.D. 32b as shown also in the wiring diagram of FIG. 6 which shows the lead 47 for the anode 15a, the lead 48 for the cathodes and the lead 49 for the reed switch 20a, resisters 33a and 34a also being shown and being for example ¼ watt 320 ohms and ½ watt 65 ohms respectively in one instance. The light-emitting diodes are viewable in this case through a clear acrylic mirror/prism assembly 50.

Figure 5:
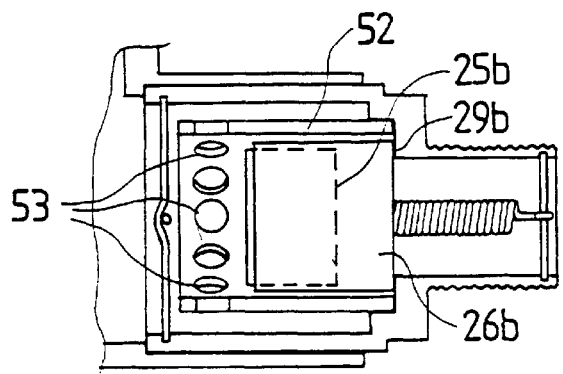
FIG. 5 shows a modified form of a switch-actuating valve assembly to be substituted for that shown in FIG. 4.

Also shown in FIG. 4 is a switch-actuating valve assembly 21a in which the ferromagnet 25a is mounted in a recess in the piston 26a and the latter is closely slidable with leak-past tolerance in a cylindrical part of the chamber 12a, a tension spring 22a being connected as in the first embodiment and restrained in its inward movement by a fence structure 51. A variation in the mounting arrangements for the piston and magnet can be seen in FIG. 5 in which the magnet 25b and piston 26b are of lesser diameter than in the other embodiments but of greater axial length, the piston being slidable in a separate tube 52 between a valve seat 29b at the outer end and the inner end portion which has regularly spaced apertures 53 therearound to facilitate flow of water to the chamber once the valve assembly has substantially opened.

The manner in which the apparatus according to these embodiments is used will be clear from the drawings and the foregoing descriptions. The apparatus has the advantage that it can be used upside down or at any angle, but preferably the water inlet and outlet openings are in a horizontal line and the chamber is such that water flow will ensure there is a contained body of water to permit electrode actions—but of course the circuit will be broken when the water flow ceases so that the magnet then exerts no influence on the on/off reed-type switch which acts to cut off flow of current between the diode and the cathodes.

When the water to be treated is allowed to flow, the piston is pushed by the water towards the anode to open the valve seat, whereupon a small percentage of the water to be treated flows past the piston towards the cathode and the anode, while the larger percentage of water holds the piston in an open position. With this mode of operation, the piston acts as a check-valve or non-return valve as well as a ferromagnet carriage. The movement of the piston brings the magnetic field created by the ferromagnet closer to the reed switch, and at a particular position the saturation flux density of the magnetic field causes the reed switch to close, completing the circuit required for the positive operation of the cathode-anode sterilising system and the operation of a light emitting diode which shows that flow is occurring.

As all ferromagnetic materials are permanently magnetised and all exhibit a phenomenon of hysteresis (a lag in response to changing forces based on energy losses resulting from internal friction), the saturation flux density and its forces upon the reed switch will remain constant and permanent allowing for very effective on/off operation of the unit. When the flow of water to be treated is discontinued, the return spring pulls the piston back to its original position closing the valve seat and preventing treated water from escaping upstream. The magnetised body may be any of those metals which exhibit the ability to be permanently magnetised such as iron, nickel and cobalt.

When using two light emitting diodes, the parts can be arranged so that the yellow L.E.D. informs the user when a dull glow is seen (less bright than that of the green) that there is conductivity between the anode and cathode and the anode is not fouled by a build-up of any contaminants that may insulate it and prevent it from releasing silver ions into the water. When the yellow L.E.D. is completely out and the green L.E.D. is aglow, this confirms the need to clean the silver anode from contaminants which may have caused it to become insulated. When the yellow L.E.D. is glowing as bright or brighter than the green L.E.D., this informs the user that the water being treated has a very high conductivity level and should be tested for potability before consumption.

While the apparatus as described and illustrated will be found very effective in achieving the objects for which the invention has been devised, many further modifications are possible such as, for example, the use of a water inlet valve arrangement whereby the light tension spring is replaced by gravitational closing effects acting as the bias means.

Also, the apparatus may be incorporated into assemblies for cleaning swimming pools or other industrial applications such as the sterilisation of sewage. Any number and types of filters can be incorporated in the flow line, and the apparatus may be preceded by a pressure-limiting valve so that water will not be allowed to reach more than a pre-determined maximum pressure at which the water sterilisation process will adequately handle the water flowing through the apparatus.

The invention will be understood to embrace all variations, modifications and additional applications as will be readily apparent to persons skilled in the art without departing from the broad scope and ambit of the invention as defined by the appended claims.

I claim:

1. Water sterilising apparatus adapted to employ the process of heavy metal sterilisation and including:

a body defining a chamber formed with spaced inlet and outlet openings whereby water may be caused to flow through the chamber from said inlet opening to said outlet opening;

at least two electrodes spacedly mounted in said chamber for flow of water therebetween in its passage from said inlet opening to said outlet opening;

electric circuit means including power cell means associated with said body and connected to said electrodes for passing electric current between said electrodes through said water;

an on/off switch in said circuit means normally disposed inoperatively so that the circuit is open when water is not entering said chamber at said inlet opening, said on/off switch being a reed switch having at least one contact member of movable leaf form and being located in said chamber;

and a switch-actuating valve assembly mounted movably adjacent to said inlet opening, said switch-actuating valve assembly being normally urged in biased manner to a position in which it closes the inlet opening but adapted to be moved against said bias by water caused to flow through said inlet opening whereby said water enters and passes through said inlet opening whereby said water enters and passes through said chamber and out said outlet opening, said switch-actuating valve assembly having a cylindrical valve piston slidable with clearance in a guide tube arranged so that its inner end communicates with the chamber while its outer end is provided with a valve seat at the inlet opening, the valve assembly being biased by means of a light tension spring connected between the outer face of the valve piston and part of the body upstream of the valve seat, said switch-actuating valve assembly having a permanent magnet for controlling operation of said reed switch;

said electrodes including a silver anode to coact with at least one cathode for the release of $Ag^+$ ions;

and the parts being so made and arranged that movement of said switch-actuating valve assembly to open the inlet opening causes said normally open switch to be closed to complete the circuit whereby electric current passes between said electrodes as water flows through said chamber.

2. Water sterilising apparatus according to claim 1, wherein said guide tube is provided with apertures through its wall intermediate its ends to facilitate water flow therethrough to the chamber prior to the water flowing to the inner end of said guide tube.

3. Water sterilising apparatus according to claim 1, wherein there are three electrodes comprising said silver anode as well as two stainless steel cathodes at equal distances on opposite sides thereof, all being co-planar and having freely projecting active ends within the chamber, the opposite or fixing ends being connected in the circuit means while said opposite or fixing ends of the cathodes are also connected to each other.

4. Water sterilising apparatus according to claim 1, wherein said circuit means includes one or more light-emitting diodes or indicators to confirm conductivity between the anode and cathode and/or to indicate a requirement for cleaning the silver anode or for taking other actions.

5. Water sterilising apparatus according to claim 1, wherein the body is of T-shaped form having aligned or coaxial inlet and outlet housings for the inlet opening and outlet opening respectively, while a third housing at right angles to the inlet and outlet housings has removably fitted therein a coupler assembly fitted with said power cell means, said electrodes and said electric circuit means.

6. Water sterilising apparatus according to claim 1, wherein the outlet opening from the chamber is connected to a delivery spout member via a housing containing granular activated carbon so that water treated by the sterilising apparatus will be filtered further prior to delivery.

* * * * *